United States Patent [19]
Shimosaka

[11] Patent Number: 5,583,835
[45] Date of Patent: Dec. 10, 1996

[54] TRACK SEARCHING METHOD FOR AN OPTICAL DISK AND DRIVING DEVICE

[75] Inventor: Wataru Shimosaka, Sakai, Japan

[73] Assignee: Funai Techno-Systems Co., Ltd., Osaka, Japan

[21] Appl. No.: 377,000

[22] Filed: Jan. 23, 1995

[30] Foreign Application Priority Data

Jan. 21, 1994 [JP] Japan .................................. 6-021922

[51] Int. Cl.[6] ................................................. G11B 17/22
[52] U.S. Cl. .................. 369/32; 369/48; 369/59
[58] Field of Search ................................ 369/32, 33, 47, 369/48, 54, 59, 50, 124; 360/32, 24

[56] References Cited

U.S. PATENT DOCUMENTS 5,420,839  5/1995  Tateishi ................................. 369/32

FOREIGN PATENT DOCUMENTS 4-313821  11/1992  Japan .
5-128551   5/1993  Japan .
5-298861  11/1993  Japan .

*Primary Examiner*—Ali Neyzari
*Attorney, Agent, or Firm*—Jordan and Hamburg

[57] ABSTRACT

In a track searching method for an optical disk drive such as CD-ROM and the like, when a search object time is given from a host computer, the number of tracks is which a difference between a present time, included in a discriminating information of track on which an optical pick-up is located, and the given searching object time is determined. In accordance with the detected number of tracks, an optical pick-up jumps. After, the number of tracks corresponding to a difference between a time included in a discriminating information of track and the above-mentioned searching object time is detected. Then, the ratio of the number of tracks to be jumped to the detected number of tracks of the difference is calculated. The ratio is accumulated in each track searching operation and its mean value is calculated. The mean value is used as revising coefficient on and after the second track searching.

3 Claims, 4 Drawing Sheets

TRACK SEARCHING METHOD FOR AN OPTICAL DISK AND DRIVING DEVICE

BACKGROUND OF THE INVENTION

The present invention relates to a track searching method and drive in which an optical pick-up, which reads out an information recorded on a track of an optical disk or a magneto optical disk and the like (hereinafter generically referred to an optical disk) is moved to an objective track.

It is conventionally known that an optical disk drive reads out an information recorded on a track of optical disk, such as CD-ROM, with an optical pick-up, by carrying out track searching where the optical pick-up jumps to an objective track, an absolute time to reach the object track is given as a searching order, the number of tracks is detected by a difference between the given absolute time and an absolute time of a track on which the optical pick-up presently located and, in accordance with the detected number of tracks, the optical pickup jumps. Here, it is supposed that a linear velocity of the optical disk is predetermined value and the number of tracks is detected. However, actually, since the linear velocity is not constant, the detected number of tracks contains error. To revise the error, when a new optical disk is set on the optical disk drive, a revising coefficient is calculated by predetermined learning. And upon track searching, the detected number of tracks to be jumped is multiplied by the predetermined revising coefficient. In accordance with the revised value, the optical pick-up is made to jump.

However, in the above-mentioned track searching method wherein the error revised by the predetermined revising coefficient, generally, since the moving characteristic of a servo system for the pick-up is non-constant in every optical disk drive, in track searching in every optical disk drive, the error is left. So, the error can not be precisely revised.

SUMMARY OF THE INVENTION

An object of the present invention is to provide a track searching method for an optical disk and driving device, wherein the error of a servo system for moving a pick-up, which is different in every optical disk drive, is precisely revised and, as a result, stable track searching is obtained.

To achieve the above-mentioned object, the present invention, includes a track searching method for an optical disk wherein an optical pick-up, which reads out information recorded on a track, jumps, in accordance with a given track discriminating information searching object, to the track on which the discriminating information is recorded, comprises: a number of tracks detecting step wherein the number of tracks to be jumped is detected by determining a difference between a track discriminating information on which the optical pick-up is located and a discriminating information of the searching object; a deviation detecting step wherein the number of tracks which is difference between the track discriminating information read out by the optical pick-up and the discrimination information of the searching object is detected, after the optical pick-up is jumped in accordance with the number of tracks detected at the number of tracks detecting step; a ratio calculating step wherein a ratio of the number of tracks detected at the deviation detecting step to the number of tracks to be jumped, which is detected at the number of tracks detecting step, is calculated; a mean value calculating step wherein the ratio calculated by the ratio calculating step is accumulated in each track searching operation and its mean value is calculated; a memorizing step wherein the mean value calculated at the ratio calculating step is memorized as a revising coefficient in track searching; and a revising track searching step wherein the number of tracks detected by the number of tracks detecting step is revised with the revising coefficient memorized at memorizing step, when next track searching is carried out.

The present invention further includes an optical disk drive wherein an optical pick-up, which reads out an information recorded on a track, jumps, in accordance with a given track discriminating information of a searching object, to the track on which the discriminating information is recorded comprises: a number of tracks detecting means which detects the number of tracks to be jumped by determining a difference between track discriminating information of a track on which the optical pick-up is located and a discriminating information of a searching object; a driving means which makes the optical pick-up jump, in accordance with the number of tracks detected by the number of tracks detecting means; a deviation detecting means which detects the number of tracks which is a difference between the track discriminating information read out by the optical pick-up from the arrived track and the discriminating information of the searching object, after the optical pick-up is jumped by the driving means; a ratio calculating means which calculates a ratio of the number of tracks detected at the deviation detecting step to the number of tracks to be jumped, which is detected at the number of tracks detecting means; a mean value calculating means which accumulates the ratio calculated by the ratio calculating means in each track searching operation and calculates a mean value; a memorizing means which memorizes the mean value calculated at the ratio calculating means as a revising coefficient for track searching; and a revising track searching means which compensates the number of tracks detected by the number of tracks detecting means with the revising coefficient memorized at memorizing means, when next track searching operation is carried out.

In the present invention of a track searching method for an optical disk and the driving device, upon receiving an order to make the optical pick-up jump to a track on which discriminating information of a searching object (for example, absolute time information, follows are the same) is recorded, the number of tracks is detected by a difference between a discriminating information recorded on a track on which the optical pick-up is presently located and the discriminating information of the searching object. After the optical pick-up jumps, in accordance with the detected number of tracks, namely, a deviation of the number of tracks which is a difference between the track discriminating information read out by the optical pick-up and the discriminating information of the searching object is detected and a ratio of the deviation to the detected number of tracks is calculated. The calculated ratio is accumulated for each track searching operation and a mean value is calculated. The calculated mean value is memorized as a revising coefficient for track searching. On next track searching, the number of tracks to be jumped revised by multiplying the memorized revising coefficient, and the track searching operation is executed in accordance with the revised number of tracks. With repeating track searching as described above, accurate track searching can be gradually obtained. Accordingly, it is possible to accurately revise error included in every optical disk drive and to provide precise and stable track searching in every driving device.

BRIEF DESCRIPTION OF THE DRAWINGS

The present invention will become apparent from the following description taken in conjunction with the preferred embodiments thereof with reference to the accompanying drawings, in which.

DETAILED DESCRIPTION OF THE INVENTION

An embodiment of the present invention is described hereinafter with reference to the accompanying drawings.

Figure 1:
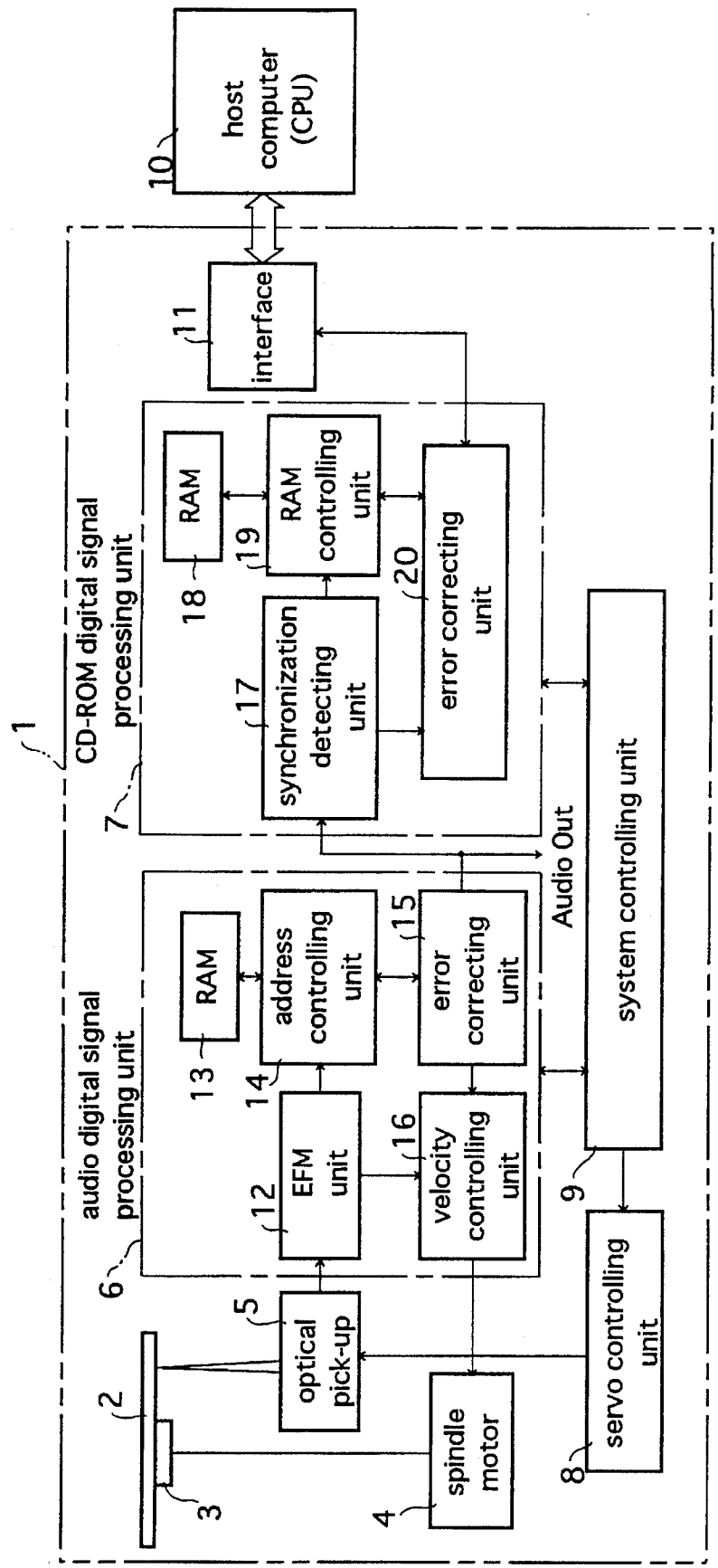
FIG. 1 is a block diagram showing a construction of a CD-ROM drive in the present invention.

FIG. 1 is a block diagram, according to the present embodiment, showing a construction of a CD-ROM drive 1 adopting a method of searching a track of an optical disk of the present invention such as CD-ROM and so on. The CD-ROM drive 1 has an audio digital signal processing unit 6 and a CD-ROM digital signal processing unit 7.

The CD-ROM drive (hereinafter referred to drive) 1 comprises a disk holder 3 to hold an optical disk 2, a spindle motor 4 to rotate the optical disk 2, an optical pick-up 5 to read out information on the optical disk 2, the audio digital signal processing unit 6, the CD-ROM digital signal processing unit 7, a servo controlling unit 8 to control focusing, tracking and positioning the optical pick-up 5, a system controlling unit 9 including a microcomputer to control the servo controlling unit 8, and an interface 11 to contact with a host computer 10.

Figure 2:
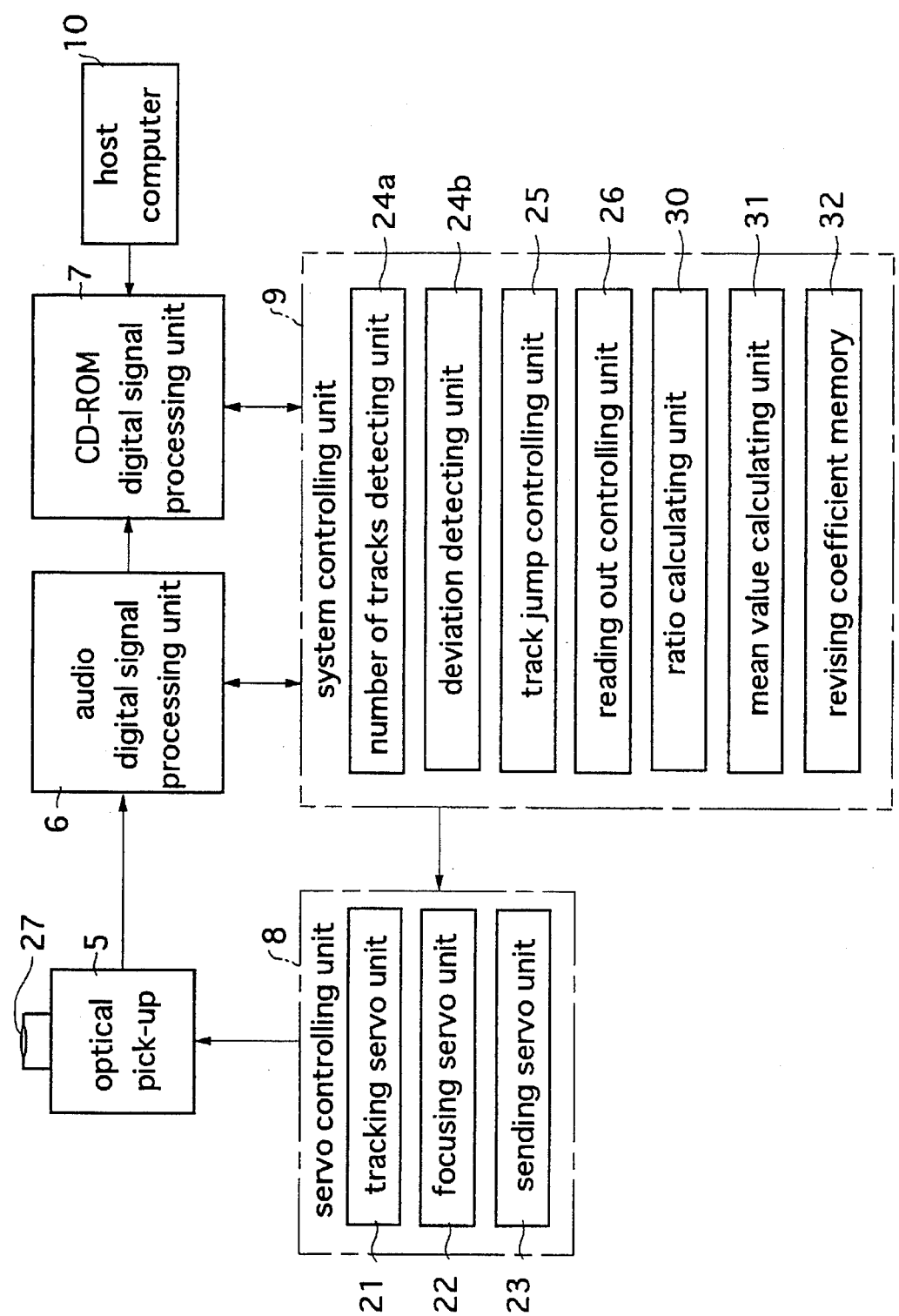
FIG. 2 is a block diagram showing a functional construction of a servo controlling unit and system controlling unit of the CD-ROM drive in the present invention.

On the optical disk 2, by one track eddying spirally from inside to outside, the plural of tracks are informed and on tracks, information comprising all kinds of data is recorded. The spindle motor 4 rotates and controls the optical disk 2 to record on tracks on the optical disk 2 at a constant linear velocity, by a controlling signal from the audio digital signal processing unit 6. The optical pick-up 5 illuminates a spot light on tracks on the optical disk 2, receives the reflecting light and reads out data. Also, it is able to move in the direction of a radial of the optical disk 2. On the optical pick-up 5, as shown in FIG. 2, an object lens 27 is provided to condense spot light, and the object lens 27 is arranged to move in the direction of the radial of the optical disk 2 and in the up and down direction from the optical disk 2. By moving of the object lens 27 in the direction of the radial, tracking servo is executed, and by moving of the object lens 27 in the up and down direction, focusing servo is executed. By using the tracking servo, even if the optical disk 2 rotates with skew, spot light always precisely traces along with track. Also, by using the focusing servo, even if a plane of the optical disk 2 rolls, the spot light on the optical disk 2 is condensed to, predetermined radial. The servo controlling unit 8 controls above-mentioned tracking servo and focusing servo, and sending servo to move the optical pick-up 5 in the direction of the radial.

The audio digital signal processing unit 6 comprises an Eight to Fourteen Modulation (EFM) unit 12 receiving a signal form the optical pick-up 5, a RAM 13 to memorize data, an address controlling unit 14 to control writing or reading data from the RAM 13, an error correcting unit 15 to correct error of data by CIRC (Cross Interleaved Reed-Solomon Code) and a velocity controlling unit 16 to control the spindle motor 4 by spindle servo. The Eight to Fourteen Modulation unit 12 modulates data, which is modulated from 8 bits data to 14 bits data and recorded on the optical disk 2, to former 8 bits data. And, the velocity controlling unit 16 outputs driving signal for controlling the spindle motor 4 velocity, in accordance with read information of track. In usual reproducing, the velocity controlling unit 16 rotatively controls the spindle motor 4 to keep predetermined linear velocity on track on the optical disk 2 (the number of rotations is fewer in inside and gets more as going outside). In searching, the velocity controlling unit 16 controls to keep the spindle motor 4 with the number of rotations of objective track with adding or reducing velocity. Still, the address controlling unit 14, in accordance with an address map in the RAM 13, de-interleaves recorded data which is interleaved. An output from the error correcting unit 15 is output to outside as an audio signal and inputted to the CD-ROM digital signal processing unit 7.

The CD-ROM digital signal processing unit 7 comprises a synchronization detecting unit 17, a RAM 18 to store reproducing data, a RAM controlling unit 19 to control writing or reading from the RAM 18 and an error correcting unit 20 to correct error by ECC (Error Correction Code) and EDC (Error Detecting Code) peculiar to CD-ROM. The synchronization detecting unit 17 detects synchronous data of data processed by the audio digital signal processing unit 6 and, in accordance with the result of the detected synchronous data, removes scramble processed on data in recording. Also, the RAM controlling unit 19, by reproducing data stored in the RAM 18, checks header address of the data. The host computer 10 inputs orders such as track searching and so on into the CD-ROM digital signal processing unit 7 via the interface 11.

The system controlling unit 9 receives a signal from the audio digital signal processing unit 6 and the CD-ROM digital signal processing unit 7 and outputs a controlling signal to the servo controlling unit 8 to control each servo for focusing, tracking and positioning for the optical pick-up 5.

FIG. 2 is a block diagram showing the functional construction of the servo controlling unit 8 and the system controlling unit 9. The servo controlling unit 8 includes a tracking servo unit 21 to execute tracking control of the optical pick-up 5, a focusing servo unit 22 to execute focusing control of the object lens of the optical pick-up 5 and a sending servo unit 23 to send the optical pick-up 5 in the direction of the radial of the optical disk 2 (containing movement in which the optical pick-up 5 jumps in track searching).

The system controlling unit 9 includes the below-mentioned functional units. A number of tracks detecting unit 24a detects the number of tracks to be jumped by determining a difference between an absolute time, which is included in discriminating information recorded on a track on which the optical pick-up 5 is presently located (the absolute time 0 is located on the most inside track), and an absolute time of a searching object, which is included in an order for track searching inputted from the host computer 10. A deviation detecting unit 24b detects the number of tracks which is difference between the absolute time read out by the optical pick-up 5 and the absolute time of the searching object, after the optical pick-up 5 jumps, in accordance with the number of tracks detected by the number of tracks detecting unit 24a.

A track jump controlling unit 25 directs the sending servo unit 23 to jump, in accordance with the number of tracks detected by the number of tracks detecting unit 24a. A read out controlling unit 26 instructs the optical pick-up to read out track information. A ratio calculating unit 30 calculates a ratio of the number of tracks, detected by the deviation detecting unit 24b, to the number of tracks, detected by the number of tracks detecting unit 24a.

A mean value calculating unit 31 accumulates the ratio calculated by the ratio calculating unit 30 in each track searching operation and calculates its mean value. A revising coefficient memory 32 memorizes the mean value calculated by the mean value calculating unit 31 as the revising coefficient for track searching. Also, the track jump controlling unit 25 has a function, of revising track searching, wherein, in a next track searching operation after obtaining the revising coefficient, the number of tracks detected by the number of tracks detecting unit 24a is multiplied by the revising coefficient memorized in the revising coefficient memory 32, and, in accordance with the revised number of tracks, track searching is carried out.

Next, a controlling movement of the drive 1 constructed as above-mentioned is described.

Figure 3:
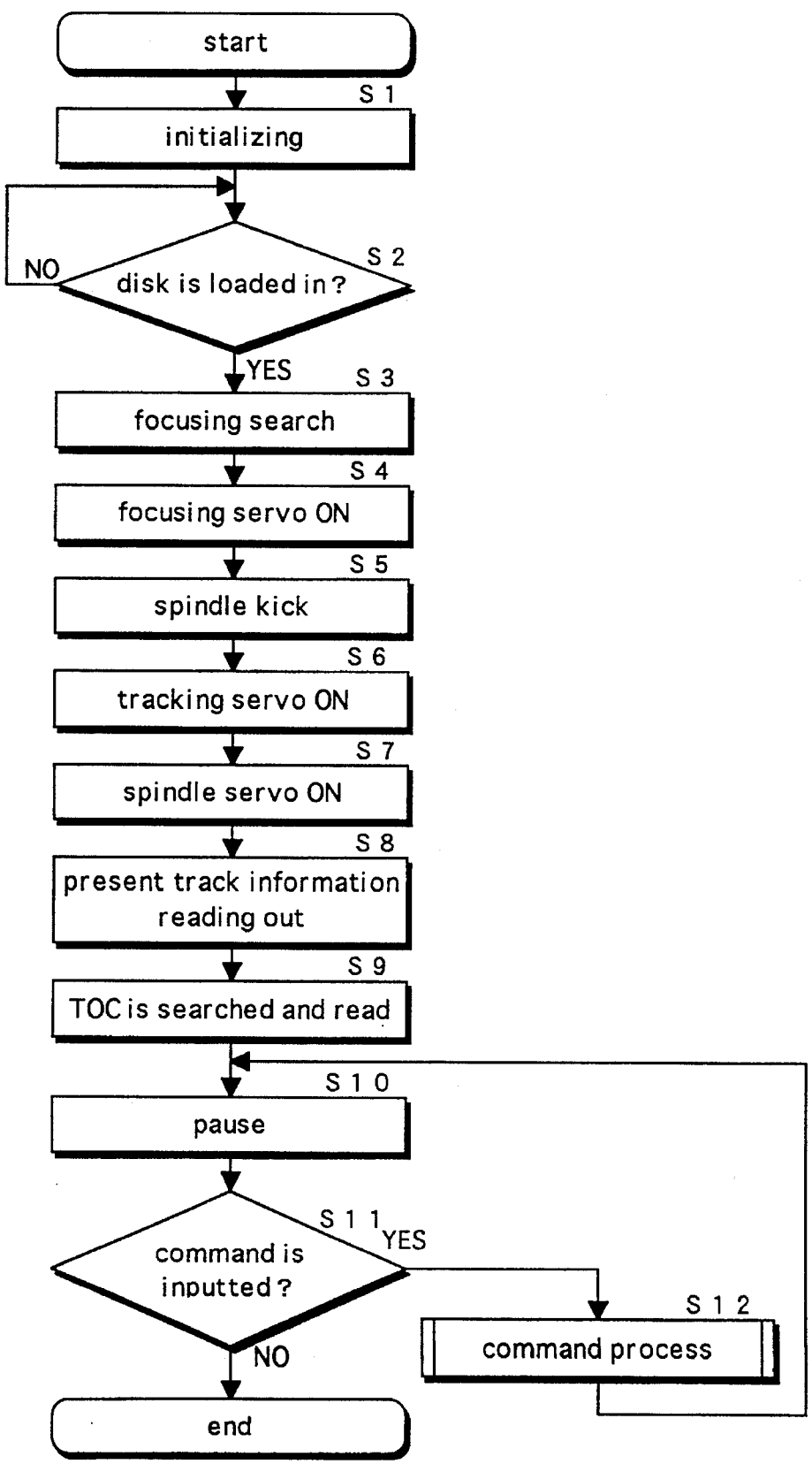
FIG. 3 is a flowchart showing a moving process of the system controlling unit of the CD-ROM drive in the present invention.

FIG. 3 is a flowchart showing a controlling process of the system controlling unit 9. First, when a power switch (not shown) is ON and power is supplied to the drive 1, an initial process such as clearing of RAM 13 and 18, moving of the optical pick-up 5 to an initial position and the like at step S1 is executed. Next, the system controlling unit 9 judges whether or not the optical disk 2 is loaded in the disk holder 3 at step S2. If yes, the system controlling unit 9 directs the servo controlling unit 8 to be focusing search ON at step S3. By this process, spot light, which illuminates the optical disk 2 from the optical pick-up 5, is condensed to a predetermined radial size. Upon finishing the focusing search, the system controlling unit 9 directs the servo controlling unit 8 to start focusing servo at step S4. The focusing servo is for moving up and down the object lens 27 of the optical pick-up 5 to keep with rolling of the plane of the optical disk 2.

Next, the system controlling unit 9 instructs the velocity controlling unit 16 to spindle kick at step S5. By this process, the spindle motor 4 is given a driving signal and a spindle kick is started. Moreover, the system controlling unit 9 directs the servo controlling unit 8 to then the tracking servo ON at step S6. The tracking servo is for moving the object lens 27 of the optical pick-up 5, in the direction of the radial, to keep the spot light on the track of the optical disk 2. Next, the system controlling unit 9 directs the velocity controlling unit 16 turn the spindle servo ON at step S7. The spindle servo is for controlling the spindle motor 4 with velocity in response to a position of radial direction to regularly keep linear velocity on the track on the optical disk 2.

After starting of spindle servo, a present track information, written in a header in each block of the optical disk 2, is read out at step S8 and information, corresponding to a table of contents of the optical disk 2, which is called TOC (Table of Contents) written in the most inside track on the optical disk 2 is searched and read at step S9. This information is stored in a memory (not shown) inside the system controlling unit 9.

The process then waits for a predetermined time at step S10 and it is judged whether or not an order (command) from the host computer 10 is inputted at step S11. If yes, a variety of command processes described below are carried out at step S12 and the process returns to step S10. If no at step S11, the process is finished.

Figure 4:
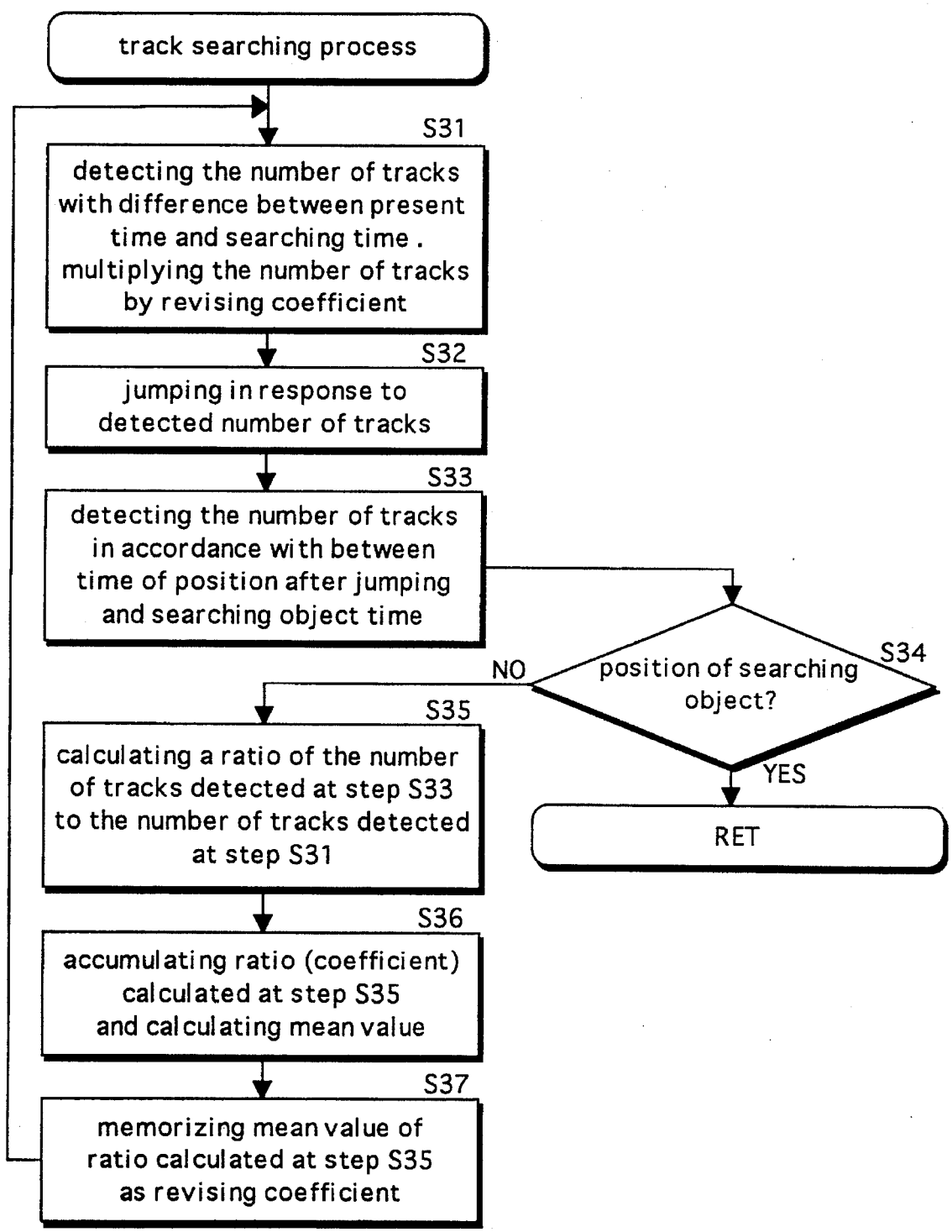
FIG. 4 is a flowchart showing a process of track searching in the present invention.

Nextly, a process of track searching carried out when a command process is inputted from the host computer 10 at above-mentioned step S12 for track searching, is explained with reference to a flowchart as shown in FIG. 4.

When the process for track searching is started, the number of tracks detecting unit 24a of the system controlling unit 9 detects the number of tracks to be jumped by determining a difference between a present time, included in discriminating information of a track on which the optical pick-up 5 is located, and a searching object time, given from the host computer 10, at step S31. Revising the number of tracks with the revising coefficient is described below. The optical disk 2 has the plurality of spiral recording tracks (bit row), wherein, for example, it is set that standard velocity is 1.3 m/sec, and recording for graduation, such as xx minutes xx seconds xx blocks (blocks indicated by 75 advancing method), is accompanied as track discriminating information. The number of tracks to be jumped is detected by the track discriminating information "xx minutes xx seconds xx blocks" as the above-mentioned present time or searching object time. After, in accordance with the detected number of tracks, the track jump controlling unit 25 directs the sending servo 23 for jumping of the optical pick-up 5 at step S32. This jump is the first jump.

Next, a time, included in the discriminating information of a track on which the optical pick-up 5 is located after the first jump is read out and the deviation detecting unit 24b detects the number of tracks jumped, in accordance with a difference (corresponding to error) between the time and read above-mentioned searching object time at step S33. In this case, generally owing to the error by mechanically cause and error of the servo system, a position to which the optical pick-up 5 is jumped is not the right place, the position of the searching object.

Next, it is judged whether or not the position of the optical pick-up 5 is the position of searching object, in accordance with whether or not the number of tracks detected at step S33 is 0 at step S34. If no, in other words, the number of tracks is not 0, the ratio calculating unit 30 calculates a ratio of the number of tracks corresponding to the difference detected at step S33 to the number of tracks to be jumped detected at step S31, at step S35.

Moreover, the mean value calculating unit 31 accumulates the ratio calculated at step S35 in each track searching operation and its mean value is calculated at step S36. Also, an accumulating value of the ratio calculated in each track searching operation to the present time is stored as data. A latest mean value is memorized in the revising coefficient memory 32, as a revising coefficient used in calculating the number of tracks at step S31. The process returns to step S31 and, hereafter, till it is judged yes at step S34, as the above-mentioned, jumping is carried out on and after the second jumping. In the process at the step S31 before jumping on and after the second jumping, since the revising coefficient is already stored in the revising coefficient memory 32, by multiplying the revising coefficient and the detected number of tracks, the number of tracks is revised. In this way, track searching to the position of the searching object is executed.

Also, if yes at step S34, in other words, the number of tracks corresponding to error is substantially 0, track searching is completed. Hereafter, in command process of tracks searching, the latest revising coefficient calculated in prior track searching operations is memorized in the revising coefficient memory 32 and jumping is carried out in accordance with the revised number of track, so that, difference detected at step S33 is lower. Accordingly, in fewer jumps (for example, once), the optical pick-up 5 can jump to track the object.

As discussed above, the latest revising coefficient to be memorized in the revising coefficient memory 32 is renewed by calculating a revising coefficient in each track searching operation. Moreover, the revising coefficient is different value in every drive 1 and it corresponds to unevenness in track searching included in most products. By track searching with use of the revising coefficient as described above, high-precision track searching is provided in accordance with every products.

As discussed above, according to the present invention of a track searching method for an optical disk and the driving device, the number of tracks to be jumped is detected in accordance with a searching order to make an optical pick-up jump to a track on which discriminating information of a searching object is located. In accordance with the detected number of tracks, the optical pick-up jumps. And, in response to the difference between discriminating information of a position after jumping and discriminating information of the searching object, the number of tracks of the difference is detected. The ratio of the number of tracks of the difference after jumping to the detected number of tracks to be jumped is calculated, and the ratio is accumulated in each track searching operation, and its mean value is used as revising coefficient. When the next track searching is being carried out, the detected number of tracks is revised with revising coefficient.

In conventional way, owing to the unevenness of moving of sending servo system for the optical pick-up in every driving device, when tracks searching is being carried out, the difference is brought out in each driving device. However, by the present invention, because the track searching operation is carried out with a revising coefficient of a learning process in each product, high-precision and stable track searching is obtained in response to each product.

The invention may be embodied in other specific forms without departing from the spirit of essential characteristics thereof. The present embodiment is therefore to be considered in all respects as illustrative and not restrictive.

What is claimed is:

1. A track searching method for an optical disk drive having an optical pick-up for reading information recorded on a track and jumping search object track in accordance with a search object track discriminating information recorded thereon, the method comprising:

reading present track discriminating information from a track at which said pick-up head is presently located;

determining a target number of tracks to be jumped from a difference between said present track discriminating information and said search object discriminating information;

jumping the pick-up head in accordance with said target number of tracks to a jumped-to track and reading track discriminating information of said jumped-to track;

determining a deviation equal to a number of tracks which is a difference between said track discriminating information of the jumped-to track and the search object discriminating information;

calculating a ratio of the deviation to the target number of tracks to be jumped;

accumulating the ratio calculated at the ratio calculating step in each track searching operation and calculating a mean value of the accumulated ratios;

storing the mean value calculated at the ratio calculating step as a revising coefficient for track searching; and revising a next target number of tracks determined by the target number of tracks determining step using the revising coefficient and repeating the above steps to find new mean value for each track searching operation.

2. A track searching method for an optical disk as claimed in claim 1, wherein the discriminating information is absolute time information.

3. An optical disk drive having an optical pick-up for reading information recorded on a track and jumping in accordance with a search object track discriminating information of an object track having the object discriminating information recorded thereon, the method comprising:

means for reading present track discriminating information from a track at which said pick-up head is presently located;

means for determining a target number of tracks to be jumped from a difference between said present track discriminating information and said search object discriminating information;

servo means for jumping the pick-up head in accordance with said target number of tracks to a jumped-to track and reading track discriminating information of said jumped-to track;

means for determining a deviation equal to the number of tracks which is a difference between said track discriminating information of the jumped-to track and the search object discriminating information;

means for calculating a ratio of the deviation to the target number of tracks to be jumped;

means for accumulating the ratio calculated at the ratio calculating step in each track searching operation and calculating a mean value of the accumulated ratios;

means for storing the mean value calculated at the ratio calculating step as a revising coefficient for track searching; and means for revising a next target number of tracks determined by the target number of tracks determining step using the revising coefficient and repeating the above steps to find new mean value for each track searching operation.

* * * * *